(12) United States Patent
Hiraiwa

(10) Patent No.: US 7,637,839 B2
(45) Date of Patent: Dec. 29, 2009

(54) MULTI-SPEED AUTOMATIC TRANSMISSION ADAPTED FOR MOTOR VEHICLE

(75) Inventor: Kazuyoshi Hiraiwa, Yokohama (JP)

(73) Assignee: Kyowa Metal Works, Co., Ltd., Yokohama (JP)

( * ) Notice: Subject to any disclaimer, the term of this patent is extended or adjusted under 35 U.S.C. 154(b) by 433 days.

(21) Appl. No.: 11/790,452

(22) Filed: Apr. 25, 2007

(65) Prior Publication Data

US 2007/0254766 A1 Nov. 1, 2007

(30) Foreign Application Priority Data

Apr. 26, 2006 (JP) .............................. 2006-121901

(51) Int. Cl.
*F16H 3/44* (2006.01)
(52) U.S. Cl. ...................... 475/284; 475/302; 475/330
(58) Field of Classification Search ................. 475/271, 475/284, 288, 302, 330
See application file for complete search history.

(56) References Cited

U.S. PATENT DOCUMENTS

| | | | | |
|---|---|---|---|---|
| 2,506,399 A | * | 5/1950 | Vincent | 475/289 |
| 3,851,614 A | * | 12/1974 | Nelson | 440/63 |
| 4,774,856 A | * | 10/1988 | Hiraiwa | 475/285 |
| 4,936,165 A | * | 6/1990 | Doyle et al. | 475/72 |
| 6,645,114 B1 | * | 11/2003 | Biallas | 475/271 |
| 2009/0082166 A1 | * | 3/2009 | Wittkopp et al. | 475/311 |
| 2009/0082167 A1 | * | 3/2009 | Wittkopp et al. | 475/311 |

FOREIGN PATENT DOCUMENTS

| | | | |
|---|---|---|---|
| DE | 40 05 204 | * | 8/1990 |
| JP | 60-205048 | * | 10/1985 |
| JP | 04-219553 | | 8/1992 |
| JP | 2005-180665 | | 7/2005 |

* cited by examiner

*Primary Examiner*—Sherry Estremsky
(74) *Attorney, Agent, or Firm*—Wenderoth, Lind & Ponack, L.L.P.

(57) ABSTRACT

A multi-speed automatic transmission includes a first planetary gear set and a second planetary gear set, which are arranged in parallel on a first output shaft and a second output shaft, respectively. An input shaft is connectable with a first ring gear through first input drive and driven gears of the input shaft and the first output shaft, being connectable with a second pinion carrier through a second input drive and driven gears of the input shaft and the second output shaft. The first output shaft is connectable with a first pinion carrier, the second output shaft being connectable with a second ring gear. A second pinion carrier is fixable to a transmission case. The first and second sun gears are connectable with the input shaft through the first input drive and driven gears and through the intermediate gear, being fixable to the transmission case.

6 Claims, 6 Drawing Sheets

FIG. 3

|   |     | C-1 | C-2 | C-3 | C-4 | B-1 | B-2 | OC |
|---|-----|-----|-----|-----|-----|-----|-----|----|
| D | 1st | O   |     |     |     |     |     | O  |
|   | 2nd | O   |     |     |     | O   |     |    |
|   | 3rd | O   | O   |     |     |     |     |    |
|   | 4th | O   |     |     | O   |     |     |    |
|   | 5th | O   |     | O   |     |     |     |    |
|   | 6th |     |     | O   | O   |     |     |    |
|   | 7th |     | O   | O   |     |     |     |    |
|   | 8th |     |     | O   |     | O   |     |    |
| R | R-1 |     | O   |     |     |     | O   |    |
|   | R-2 |     |     |     | O   |     | O   |    |
| L | 1st | O   |     |     |     |     | O   |    |

FIG. 5

|   |      | C-0 | C-1 | C-2 | C-3 | C-4 | B-1 | B-2 | OC |
|---|------|-----|-----|-----|-----|-----|-----|-----|----|
| D | 1st  | ◎ | ○ |   |   |   |   |   | ○ |
|   | 2nd  | ○ | ○ |   |   |   | ○ |   |   |
|   | 3rd  | ○ | ○ | ○ |   |   |   |   |   |
|   | 4th  | ○ | ○ |   |   | ○ |   |   |   |
|   | 5th  | ○ | ○ |   | ○ |   |   |   |   |
|   | 6th  |   | ○ | ○ | ○ |   |   |   |   |
|   | 7th  | ○ |   | ○ | ○ |   |   |   |   |
|   | 8th  | (○) |   |   | ○ |   | ○ |   |   |
| R | R-1  | ◎ |   | ○ |   |   |   | ○ |   |
|   | R-2  |   |   |   |   | ○ |   | ○ |   |
| L | 1st  | ◎ | ○ |   |   |   |   | ○ |   |

MULTI-SPEED AUTOMATIC TRANSMISSION ADAPTED FOR MOTOR VEHICLE

BACKGROUND OF THE INVENTION

1. Field of the Invention

The present invention relates to a multi-speed automatic transmission, adapted for a motor vehicle, which has a planetary gear sets and is arranged in a lateral direction of its vehicle body.

2. Description of the Related Art

Recently, automatic transmissions mounted on motor vehicles require more forward speeds, for example more than six forward speeds, in order to improve fuel consumption, exhaust emission purification, and accelerating performance. Such a conventional multi-speed automatic transmission for a motor vehicle is disclosed in Japanese patent laid-open publication No. (Tokkaihei) 04-219553. This conventional multi-speed automatic transmission has two gear sets, one of which is a Ravigneaux type planetary gear set, or three gear sets associated with five friction elements to provide forward 6-speeds. These gear sets and friction elements are arranged in series in an axial direction of the transmission, which requires space longer in the axial direction and causes great difficulties for its installation on a motor vehicle such as a front-engine front-drive (FF) vehicle and a rear-engine rear-drive (RR) vehicle, in which the transmission is arranged in a lateral direction of a vehicle body.

In order to avoid such a disadvantage, another conventional multi-speed automatic transmission has been proposed, and disclosed in Japanese patent laid-open publication No. 2005-180665. This conventional transmission has two planetary gear sets and five to six friction elements, the planetary gear sets and the friction elements being separated into two groups to be arranged on two parallel shafts.

This conventional multi-speed automatic transmission, however, can not avoid arrangement of four friction elements, consisting of two clutches and two brakes, from being arranged in series on an axis of one of the planetary gear set, although its axial length can be shorten in comparison with the former conventional automatic transmission. Especially, one brake can not avoid being arranged at an outer side of a chain connecting a first planetary gear set and a second planetary gear set. This requires further improvement in decreasing its axial directional length in order to install the automatic transmission on a smaller vehicle.

It is, therefore, an object of the present invention to provide a multi-speed automatic transmission adapted for a motor vehicle which overcomes the foregoing drawbacks and can decrease an axial length of the automatic transmission for easily installing it on a smaller vehicle, obtaining appropriate transmission gear ratios corresponding to more than six forward speeds.

SUMMARY OF THE INVENTION

According to the first aspect of the present invention there is provided a multi-speed automatic transmission adapted for a motor vehicle including a transmission case, an input shaft having a first input drive gear and a second input drive gear, a first output shaft having a first output drive gear at an one end portion thereof and arranged in parallel with the input shaft, a second output shaft having a second output drive gear and arranged in parallel with the input shaft and the first output shaft, a first input driven gear rotatable on the first output shaft and engaging with the first input drive gear, a second input driven gear rotatable on the second output shaft and engaging with the second input dive gear, an output driven gear in mesh with the first output drive gear and the second output drive gear, a first planetary gear set, a second planetary gear set, and an intermediate gear arranged in coaxial with the input shaft. The first planetary set is interposed between the input shaft and the first output drive gear and arranged in coaxial with the first output shaft to change a rotational speed of the input shaft to a rotational speed of the first output drive gear, the first planetary gear set including a first sun gear, a first ring gear, a plurality of first pinions supported by a first pinion carrier and engaging with the first sun gear and the first ring gear. The second planetary gear set is interposed between the input shaft and the second output drive gear and arranged in coaxial with the second output shaft to change the rotational speed of the input shaft to a rotational speed of the second output drive gear, the second planetary gear set including a second sun gear, a second ring gear, a plurality of second pinions supported by a second pinion carrier and engaging with the second sun gear and the second ring gear. The intermediate gear connects with the first sun gear and the second sun gear. The input shaft is connectable with the first ring gear through the first input drive gear and the first input driven gear and is connectable with the second pinion carrier through the second input drive gear and the second input driven gear. The first output shaft is connectable with the first pinion carrier, and the second output shaft is connectable with the second ring gear. The second pinion carrier is fixable to the transmission case. The first sun gear and the second sun gear are connectable with the input shaft through the first input drive gear and the first input driven gear and through the intermediate gear. The first sun gear and the second sun gear are fixable to the transmission case.

Therefore, the multi-speed automatic transmission can further decrease its axial length, thereby enabling it to be installed on motor vehicles whose width is smaller. In addition, it can obtain appropriate transmission gear ratios corresponding to more than six forward speeds.

Preferably, the multi-speed automatic transmission further includes an intermediate member which is arranged in coaxial with the first output shaft and is arranged between the input shaft and the first ring gear and between the input shaft and the first sun gear so that the intermediate member can be connected with the first ring gear with by a first clutch and can be connected with the first sun gear by a second clutch. The input shaft and the intermediate member are connectable with each other by a moving-off clutch.

Therefore, thus-using of the moving-off clutch can remove a fluid coupling or a torque converter, and accordingly an axial length of the automatic transmission can be set smaller.

Preferably, the moving-off clutch is arranged on one of the input shaft and the intermediate member.

Therefore, when it is arranged on the input shaft, a diameter thereof can be larger, being desirable for heavyweight motor vehicles and large-displacement engines. On the other hand, when it is arranged on the intermediate member, the axial length of the automatic transmission can be set smaller, being desirable for compact motor vehicles.

Preferably, the multi-speed automatic transmission further includes a first reaction gear engaged with the intermediate gear and connected with the first sun gear, and a second reaction gear engaged with the intermediate gear and connected with the second sun gear. The intermediate gear and the first reaction gear provide an overdrive gear ratio, and the intermediate gear and the second reaction gear provide a reduced gear ratio.

Therefore, this can provide appropriate gear ratios and gear steps of the automatic transmission having more than six forward speeds.

BRIEF DESCRIPTION OF THE DRAWINGS

The objects, features and advantages of the present invention will become apparent as the description proceeds when taken in conjunction with the accompanying drawings, in which:

FIG. 3 is a shift table showing a relationship between states of friction elements and gears established thereby in the automatic transmission shown in FIG. 1;

FIG. 5 is a shift table showing a relationship between states of friction elements and gears established thereby in the automatic transmission shown in FIG. 4;

DESCRIPTION OF THE PREFERRED EMBODIMENTS

Figure 1:
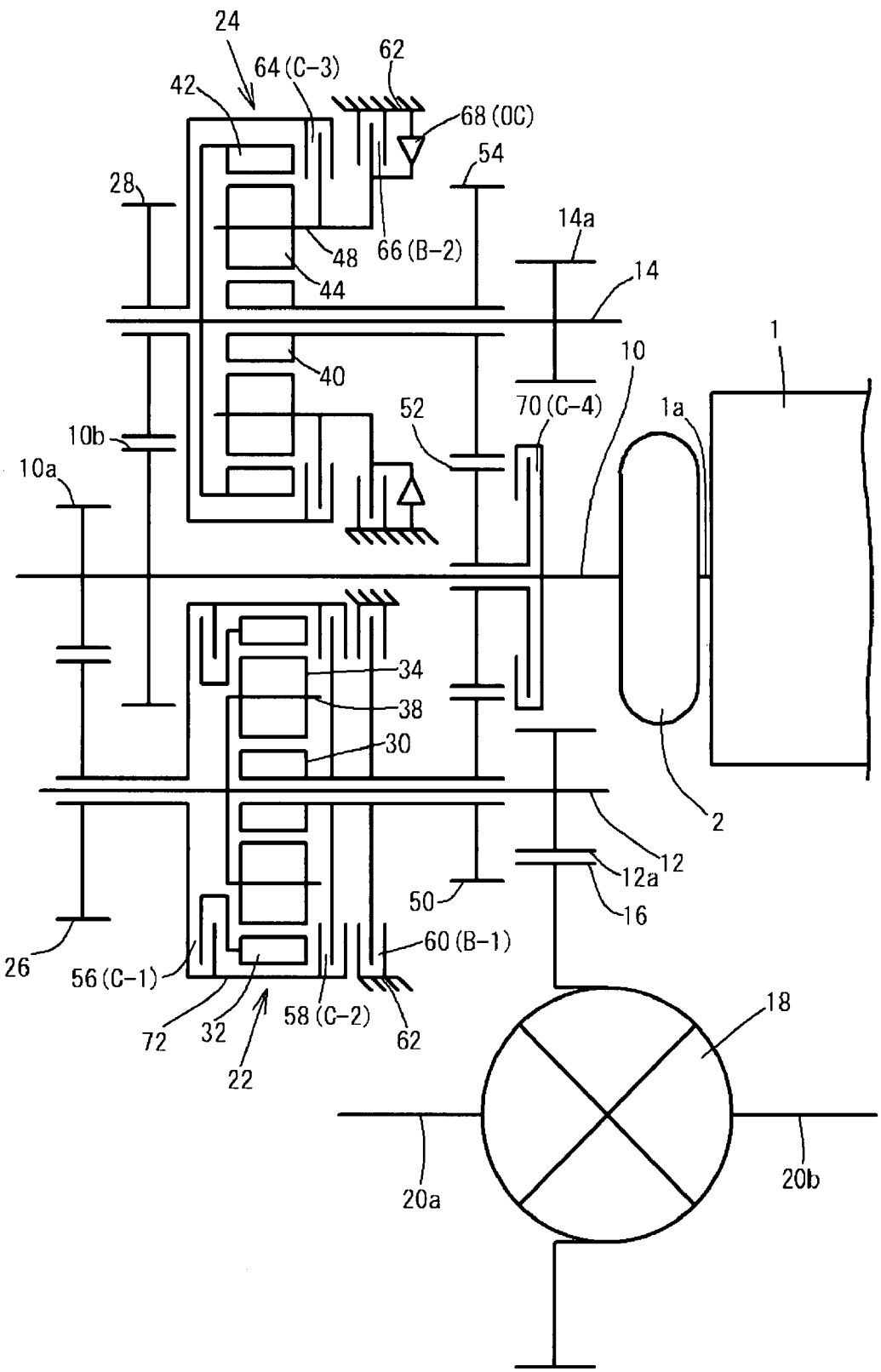
FIG. 1 is a schematic view showing a skeleton of a gear train of a multi-speed automatic transmission of a first preferred embodiment according to the present invention, taken along a line A-A in FIG. 2.

Throughout the following detailed description, similar reference characters and numbers refer to similar elements in all figures of the drawings.

An 8-speed automatic transmission, adapted for a motor vehicle, of a first preferred embodiment according to the present invention will be described with reference to the accompanying drawings.

Figure 2:
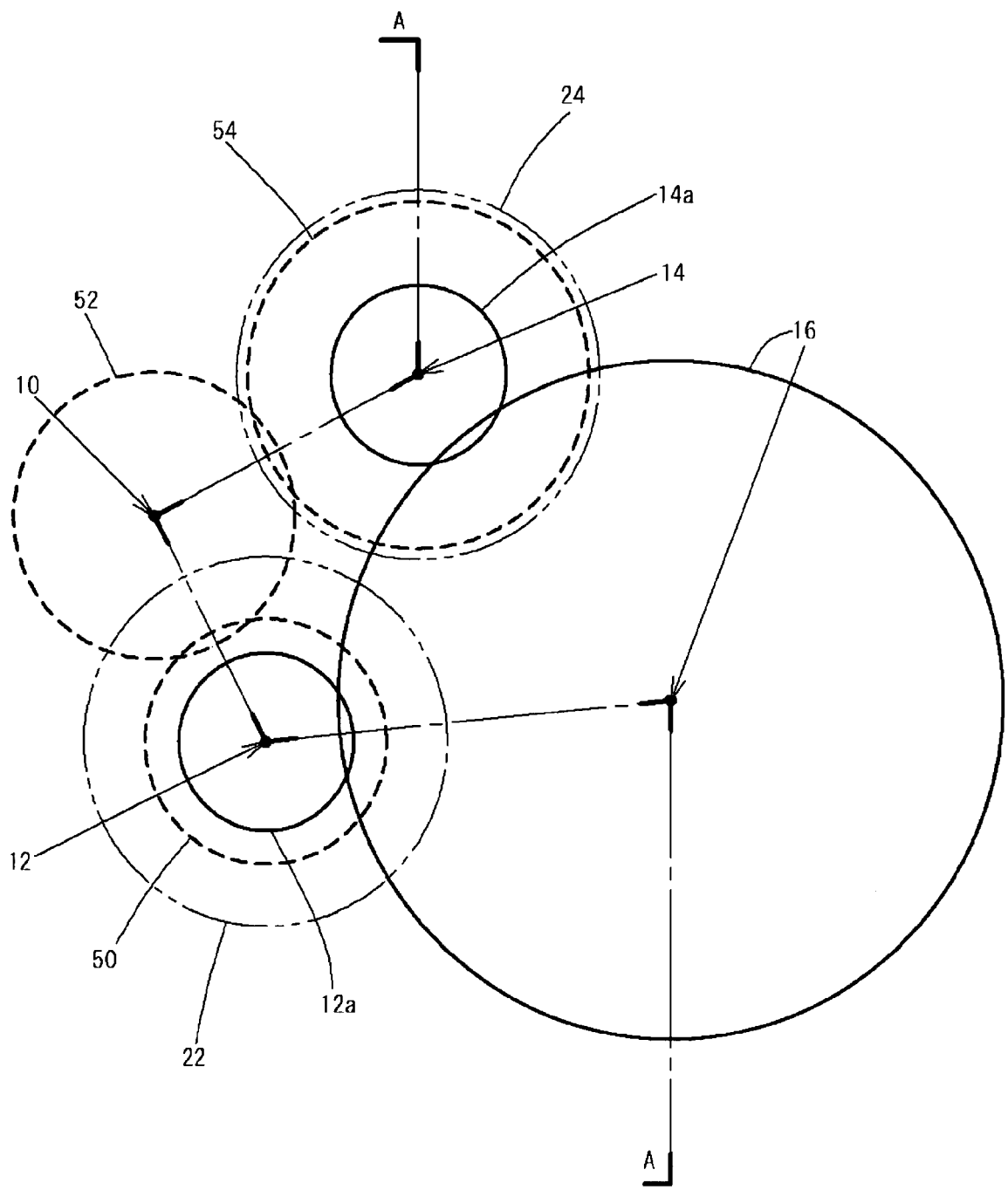
FIG. 2 is a view showing arrangement of gears and shafts used in the gear train of the multi-speed automatic transmission of the first embodiment shown in FIG. 1, seen from a left side toward a right side in FIG. 1.

As shown in FIGS. 1 and 2, the 8-speed automatic transmission of the firs embodiment is mounted, for example, on a front part of a not-shown vehicle body of a motor vehicle so that it is arranged in a lateral direction of the vehicle body. It is equipped with an input shaft 10, a first output shaft 12, a second output shaft 14, a first planetary gear set 22, and a second planetary gear set 24 so that the shafts 10, 12 and 14 are arranged in parallel with one another.

The first planetary gear set 22 is a single pinion type one, and includes a first sun gear 30, a first ring gear 32, and a plurality of first pinions 34 rotatably supported by a first pinion carrier 38 connected with the first output shaft 12, where each of the first pinions 34 is arranged between the first sun gear 30 and the first ring gear 32, being meshed with them.

The second planetary gear set 24 is a single pinion type one, and includes a second sun gear 40, a second ring gear 42 connected with the second output shaft 14, and a plurality of second pinions 44 rotatably supported by a second pinion carrier 48, where each of the second pinions 44 is arranged between the second sun gear 40 and the second ring gear 42, being meshed with them.

The input shaft 10 is arranged in coaxial with a crank shaft 1a of an internal combustion engine 1 and connected with the engine 1 via a fluid coupling 2 at its one end portion, being integrally fixed with a first input drive gear 10a and a second input drive gear 10b at its other end portion.

The first input drive gear 10a is in mesh with a first input driven gear 26, and the first input driven gear 26 is relatively rotatable on the first output shaft 12 via not-shown bearings. The first input driven gear 27 is connected with an intermediate member 72 outside of the first planetary gear set 22 to be connectable with the first ring gear 32 through a first clutch 56, and is also connectable with the first sun gear 30 through a second clutch 58. The sun gear 30 is fixable to a transmission case 62 by a first brake 60. The first clutch 56 and the second clutch 58 are provided on the intermediate member 72 and are arranged so that they sandwich the first ring gear 32 and are next to the first brake 60 at a first-planetary-gear-set (22) side. The first clutch 56 and the second clutch 58 are also arranged between the first planetary gear set 22 and a first reaction gear connected with the first sun gear 30 and engaged with an intermediate gear 52. The first reaction gear 50 is relatively rotatable on the first output shaft 12.

The second input drive gear 10b is in mesh with a second input driven gear 28, and the second input driven gear 28 is relatively rotatable on the second output shaft 14 via not-shown bearings. The second input driven gear 28 is connectable with the second pinion carrier 48 through the third clutch 64, which is arranged at an engine 1 side of the second planetary gear set 24 and connected with a second brake 66 and a one-way clutch 68 so that the second pinion carrier 48 can be stopped in all rotational directions by the second brake 66 or in one rotational direction by the one-way clutch 68. The second brake 66 and the one-way clutch 68 are arranged in parallel to each other and between the third clutch 64 and a second reaction gear 54 connected with the second sun gear 40 and engaged with the intermediate gear 52. The second reaction gear 54 is relatively rotatable on the second output shaft 14.

The intermediate gear 52 is relatively rotatable on the input shaft 10 and is connectable with the input shaft 10 through a fourth clutch 70. The fourth clutch 70 is arranged between the intermediate gear 52 and the fluid coupling 2.

The first output shaft 12 is provided with a first drive gear 12a at its engine (1) side so that the first drive gear 12a engages with an output gear 16. The second output shaft 14 is provided with a second drive gear 14a at its engine (1) side so that the second drive gear 12a engages with the output gear 16. Note that the second drive gear 12a always engages with the output shaft 16 as shown in FIG. 2, although they are illustrated to be apart from each other because of a development view of FIG. 1. In FIG. 2, circle lines indicate external diameters of the gears 12a, 14a, 16, 50, 52 and 54 and filled circles indicate axial centers of the shafts 10, 12 and 14 and the output gear 16.

The output gear 16 is connected with a pair of drive shafts 20a and 20b respectively connected with not-shown drive wheels through differential gears 18.

The multi-speed automatic transmission of the first embodiment will be described.

Friction elements, consisting of the first to fourth clutches 56, 68, 64 and 70, and the first and second brake 60 and 66, are operated based on vehicle speed, an accelerator pedal angle, a select-lever position and others in order to obtain optimum gears according to a shift table shown in FIG. 3. Incidentally, the one-way clutch 68 is mechanically and automatically operated according to a rotation state of the second pinion carrier 48 also as shown in FIG. 3.

In the shift table of FIG. 3, "D", "R" and "L" indicate a forward drive position, a reverse position and a forward low drive position of the select lever position, respectively and "1st" to "8th" and "R-1" and "R-2" indicate first to eighth speeds and first to second reverse speed, respectively. "C-1" to "C-4" indicates the first to fourth clutches 56, 58, 64 and 70, and "B-1", "B-2" and "OC" indicate the first brake 60, the second brake 66 and the one-way clutch 68, respectively. A mark "○" indicates application of the corresponding friction element, while no mark indicates release of the corresponding friction element.

Hereinafter, a first ratio α1 of the first planetary gear set 22 is defined as (the number of teeth of the first sun gear 30)/(the number of teeth of the first ring gear 32), and a second ratio α2 of the second planetary gear set 24 is defined as (the number of teeth of the first sun gear 40)/(the number of teeth of the first ring gear 42). A first input ratio i1 is defined as (the number of teeth of the first input driven gear 26)/(the number of teeth of the first input drive gear 10a), and a second input ratio i2 is defined as (the number of teeth of the second input driven gear 28)/(the number of teeth of the second input drive gear 10b). A third input ratio i3 is defined as (the number of teeth of the first reaction gear 50)/(the number of teeth of the intermediate gear 52), and a fourth input ratio i4 is defined as (the number of teeth of the second reaction gear 54)/(The number of teeth of the second reaction gear 54)/(the number of teeth of the intermediate gear 52).

In this embodiment, α1, α2, i1, i2, i3 and i4 are set to be 0.41, 0.54, 1.76, 0.90, 0.85 and 1.22, respectively. Accordingly, the first input driven gear 26 is driven by the first input drive gear 10a of the input shaft 10 at a reduced speed, while the second input driven gear 28 is driven by the second input drive gear 10b of the input shaft 10 at an overdrive speed. Incidentally, α2·i2·i3/{i1·i4·α1·(1+α2) is described as AB in the following equations in order to simply describe an equation, and accordingly it becomes 0.305 in this embodiment.

In order to obtain a first forward gear in the D position, the first clutch 56 is engaged to connect the first input driven gear 26 and the first ring gear 32 with each other, and the one-way clutch 68 holds to fix the second carrier 48 on the transmission case 62. In this state, the one-way clutch 68 is applied in a direction where the motor vehicle is driven forward, while it is released in its opposite direction, so that the output gear 16 cannot drive the input shaft 10 and engine-braking cannot be obtained.

A first gear ratio is defined as (the rotation speed of the input shaft 10)/(the rotation speed of the first and second output shafts 12 and 14), and is equal to i1·(1+α1)+α1·i1·i4/(α1·i3). This first gear ratio is 4.400 when α1, α2, i1 to i4 are set to have the values described above.

In order to obtain a second forward gear from the first forward gear in the D position, engagement of the first clutch 56 is maintained, and the first brake 60 is applied to hold and fix the first sun gear 30 on the transmission case 62. In this state, the one-way clutch 68 automatically releases fixation of the second pinion carrier 48 to the transmission case 62 because of its rotation in the opposite direction. This can suppress shift shock from the first forward gear to the second forward gear, because its control can be performed only by controlling the first brake 60.

This provides a second gear ratio equal to i1·(1+α1). The second gear ratio is 2.482 when α1, α2, i1 to i4 are set to have the values described above.

In order to obtain a third forward gear from the second forward gear in the D position, the first clutch 56 is kept to be engaged, and the second clutch 58 is engaged to connect the first input driven gear 26 and the first sun gear 30 with each other, the first brake 60 being released.

This makes the first planetary gear set 22 to rotate as one unit, thereby providing a third gear ratio equal to i1. Therefore, the third gear ratio is 1.760 when α1, α2, i1 to i4 are set to have the values described above.

In order to obtain a fourth forward gear from the third forward gear in the D position, the first clutch 56 is still kept to be engaged, and the fourth clutch 70 is engaged to connect the first sun gear 30 and the input shaft 10 with each other through the intermediate gear 52 and the first reaction gear 12a, the third clutch 58 being released.

This provides a fourth gear ratio equal to i1·i3·(1+α1)/{i3·(1+α1)+α1·(i1−i3)}, and therefore the fourth gear ratio is 1.342 when α1, α2, i1 and i2 are set to have the values described above.

In order to obtain a fifth forward gear from the fourth forward gear in the D position, the first clutch 56 is kept to be engaged, and the third clutch 64 is engaged to connect the second input driven gear 28 and the second pinion carrier 48 with each other, the fourth clutch 64 being released.

This provides a fifth gear ratio equal to {i2+AB·i1·(1+α1)·(1+α2)}/{(1+AB)·(1+α2)}, and therefore the fifth gear ratio is 1.027 when α1, α2, i1 and i2 are set to have the values described above.

In order to obtain a sixth forward gear from the fifth forward gear in the D position, the third clutch 64 is kept to be engaged, and the fourth clutch 70 is engaged to connect the second sun gear 40 and the input shaft 10 with each other through the intermediate gear 52 and the second reaction gear 14a, the first clutch 56 being released.

This provides a sixth gear ratio equal to i2·i4/{α2·(i4−i2)+i4}, and therefore the sixth gear ratio is 0.788, an overdrive gear ratio, when α1, α2, i1 and i2 are set to have the values described above.

In order to obtain a seventh forward gear from the sixth forward gear in the D position, the third clutch 64 is kept to be engaged to connect the second sun gear 40 and first input driven gear 26 with each other through the second pinion carrier 48, the second input driven gear 28, the second input drive gear 10b and the first input drive gear 10a, and the second clutch 58 is engaged to connect the first sun gear 30 and the first input driven gear 26 with each other, the fourth clutch 70 being released.

This provides a seventh gear ratio equal to i1·i2·/{i1·i4+α2(i1·i4−i2·i3)}, and therefore the seventh gear ratio is 0.668 when α1, α2, i1 and i2 are set to have the values described above.

In order to obtain an eighth forward gear from the seventh forward gear in the D position, the third clutch 64 is kept to be engaged to connect the second pinion carrier 48 and the second input driven gear 28 with each other, and the first brake 66 is applied to hold and fix the first sun gear 30 and the second sun gear 40 on the transmission case 62, the second clutch 58 being released.

This provides an eighth gear ratio equal to i2/(1+α2), and therefore the eighth gear ratio is 0.584 when α1, α2, i1 and i2 are set to have the values described above.

In order to obtain a first reverse gear in the Reverse (R) position, the second clutch 58 is engaged to connect the second sun gear 40 and the first input driven gear 26 with each other through the second pinion carrier 48, the second input driven gear 28, the second input drive gear 10b and the first input drive gear 10a, and the second brake 66 is applied to hold and fix the second pinion carrier 48 on the transmission case 62.

This provides a first reverse gear ratio equal to −i1·i4/(α2·i3), and therefore the first reverse gear ratio is −4.678, rotating in a reward direction, when α1, α2, i1 and i2 are set to have the values described above.

In order to obtain a second reverse gear in the Reverse (R) position, the fourth clutch 70 is engaged to connect the second reaction gear 54 and the input shaft 10 with each other through the intermediate gear 52, and the second brake 66 is applied to hold and fix the second pinion carrier 48 on the transmission case 62.

This provides a second reverse gear ratio equal to $-i4/\alpha 2$, and therefore the second reverse gear ratio is $-2.259$, rotating in the reward direction, when $\alpha 1$, $\alpha 2$, i1 and i2 are set to have the values described above.

In order to obtain a first forward gear in a LOW (L) position where the engine braking can provided, the first clutch 56 and 60 is engaged similarly at the first forward gear in the D position, and the second brake 66 is applied, so that the second pinion carrier 48 is held and fix on the transmission case 66. Accordingly, the output gear 16 can drive the input shaft 10, and accordingly the engine braking can be obtained. This gear ratio has the same value as the first gear ratio in the D position.

This eighth-speed automatic transmission of the first embodiment can have gear ratios varying from 4.400 to 0.584, providing a wide gear ratio of 7.528, obtained by (the first gear ratio)/(the eighth gear ratio).

On the other hand, a gear step can be expressed as a ratio of adjacent gear ratios. In this embodiment, when $\alpha 1$, $\alpha 2$, i1 to i4 are set to have the values described above, a first-second gear step between the first gear ratio and the second gear ratio is 1.773, a second-third gear step between the second gear ratio and the third gear ratio is 1.410, a third-fourth gear step between the third gear ratio and the fourth gear ratio is 1.311, the fourth-fifth gear step between the fourth gear ratio and the fifth gear ratio is 1.306, a fifth-sixth gear step between the fifth gear ratio and the sixth gear ratio is 1.303, a sixth-seventh gear step between the sixth gear ratio and the seventh gear ratio is 1.180 and a seventh-eighth gear step between the seventh gear ratio and the eighth gear ratio is 1.143.

These gear steps become smaller as its gear is higher-speed one, which gives preferable gear-ratio characteristics when a motor vehicle is propelled by using an internal combustion engine. These characteristics can be obtained because the third input ratio i3, determined based on the teeth numbers of the intermediate gear 52 and the first reaction gear 50, is set to have an overdrive gear ratio and the fourth input ratio i4, determined based on the teeth numbers of the intermediate gear 52 and the second reaction gear 54 is set to have a reduced gear ratio.

In the above-described automatic transmission, the gear ratios and the gear steps may be varied by changing the first input ratio i1 between the first input drive gear 10a and the first input driven gear 26 as follows.

When the first input ratio i1 is set to be 1.73 instead of 1.76, the first gear ratio to the eighth gear ratio are 4.325, 2.439, 1.730, 1.330, 1.023, 0.788, 0.670, 0.584, respectively, where its wide gear ratio is 7.400, and the first-second gear step to the seventh-eighth gear step are 1.773, 1.410, 1.301, 1.299, 1.298, 1.177, 1.146, respectively.

When the first input ratio i1 is set to be 1.86 instead of 1.76, the first gear ratio to the eighth gear ratio are 4.650, 2.623, 1.860, 1.359, 1.041, 0.788, 0.663, 0.584, respectively, where its wide gear ratio is 7.956, and the first-second gear step to the seventh-eighth gear step are 1.773, 1.410, 1.346, 1.328, 1.320, 1.189, 1.134, respectively.

As understood from the above examples, changing only the first input ratio i1 can change the wide gear ratio, keeping the gear steps to be smaller in the order. Therefore, the automatic transmission of the first embodiment can be adapted for various combinations of motor vehicles and engines by changing only the first input drive gear 10a and the first input driven gear 26, which can notably decrease manufacturing costs.

In addition, in the first embodiment, the first planetary gear set 22 is arranged on the first out put shat 12, the second planetary gear set 24 is arranged on the second output shaft 14 in parallel to the first output shaft 12, and the friction elements, namely the first to fourth clutches 32, 58, 64 and 70, the first and second brakes 60 and 66 and the o-way clutch 68 are separated to be arranged on the first and second output shafts 12 and 14 and the input shaft 10. Therefore, an axial length of the automatic transmission of the first embodiment can be smaller, obtaining eight speeds. Removing one speed from the eight speeds, a seven-speed automatic transmission can be easily obtained. This can be carried out only by changing control of the clutches and the brakes.

Next, an automatic transmission of a second embodiment according to the present invention will be described with reference to the accompanying drawings of FIGS. 4 and 5.

Figure 4:
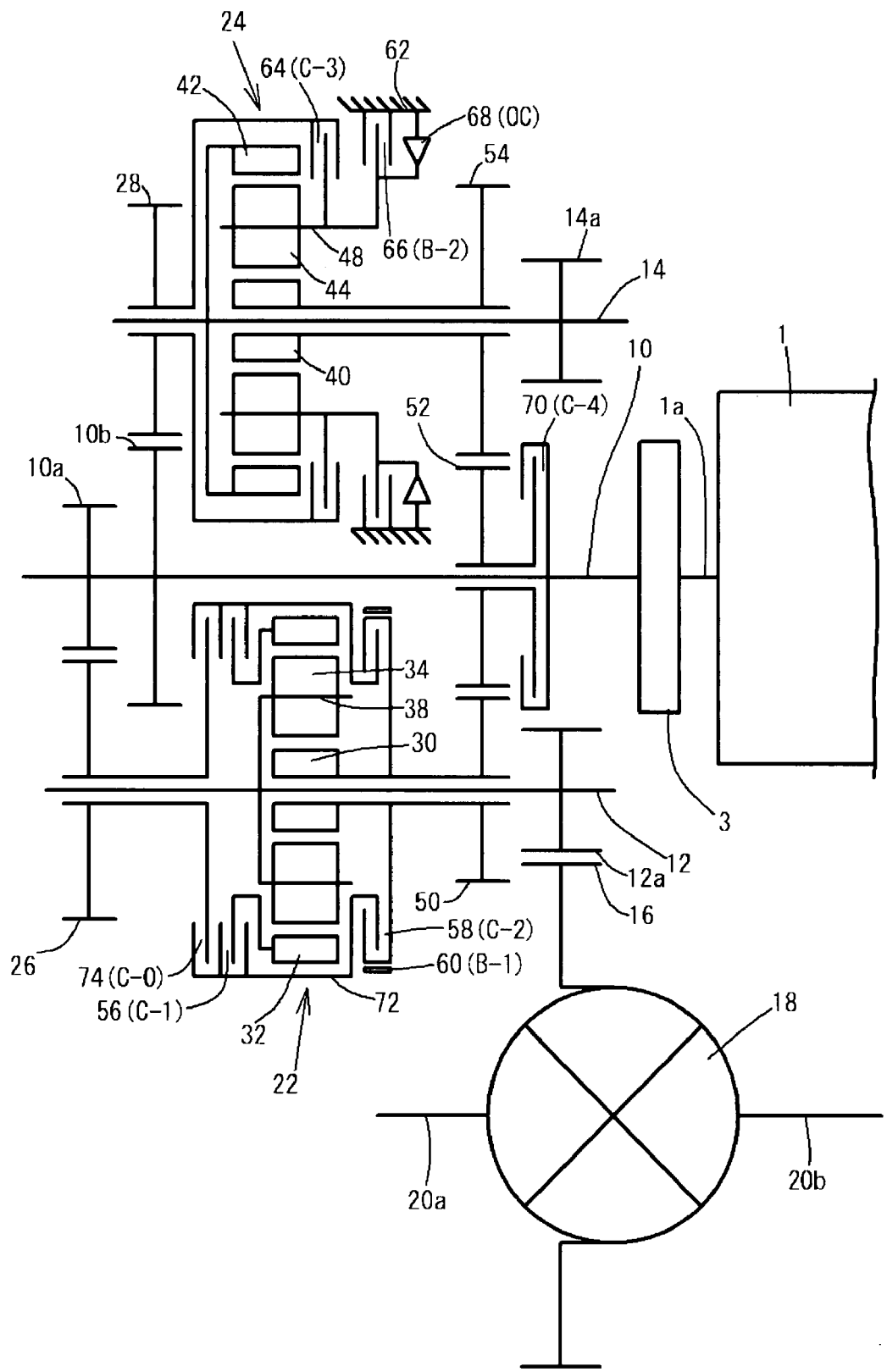
FIG. 4 is a schematic view showing a skeleton of a gear train of a multi-speed automatic transmission of a second preferred embodiment according to the present invention.

As shown in FIG. 4, the automatic transmission of the second embodiment has a first planetary gear set 22 arranged on a first output shaft 12 and a second planetary gear set 24 arranged on a second output shaft 14 similarly to those of the first embodiment. An intermediate member 72 is provided at a radially-outer side of the first planetary gear set 22, and is equipped with a moving-off clutch 74, namely a starting clutch, and a first clutch 56 at a first input driven gear (26) side of the first planetary gear set 22. The moving-off clutch 74 is capable of connecting the intermediate member 72 and the first input driven gear 26 with each other, and the first clutch 56 is capable of connecting the intermediate member 72 and a first ring gar 25 with each other. The intermediate member 72 is also provided with a second clutch 58 at an engine (1) side of the first planetary gear set 22. Accordingly, an input shaft 10 is connectable with the first ring gear 32 through the moving-off clutch 74 and the first clutch 56, and is also connectable with a first sun gear 30 through the moving-off clutch 74 and the second clutch 58.

A first brake 60 is arranged at a radially-outer side of the second clutch 58 and is a band brake in this embodiment to act as similarly to the first brake of the first embodiment. It may be a multi-plate brake.

A damper 3 is provided between a crank shaft of an engine 1 and the input shaft 10, removing the fluid coupling 2 of the first embodiment, because the moving-off clutch 74 is used for starting a motor vehicle.

The other parts of the second embodiments are similar to those of the first embodiment, and their descriptions are omitted.

The operation of friction elements is shown in FIG. 5, which is similar to FIG. 3 of the first embodiment, except adding operations of the moving-off clutch 74. In FIG. 5, a mark of a double circle indicates application with slippage when the motor vehicle starts of the corresponding friction element (the moving-off clutch 74 in this embodiment), while a mark "(○)" indicates application unrelated to power transmission of the corresponding friction element (the moving-off clutch 74 in this embodiment). Incidentally, the moving-off clutch 74 is also expressed as "C-0" in FIGS. 4 and 5.

In the automatic transmission of the second embodiment, a first gear to an eighth gear are obtained similarly to those of the first embodiment, except that the moving-off clutch 74 is engaged after being slipped at a first gear and a first reverse gear.

Specifically, at the first forward gear, the first clutch 56 is engaged, and the moving-off clutch 74 is controlled to slip and gradually be engaged, and then with application of a one-way clutch 68 the motor vehicle can start.

In order to obtain a sixth forward gear, the first clutch 56 and the second clutch 58 are engaged in a state where the third clutch 64 is engaged in this embodiment, although the sixth forward gear, as an intermediate gear between a fifth forward gear and a seventh forward gear, can be also obtained by engagements of the third clutch 64 and a fourth clutch 70 similarly to those of the first embodiment.

The first clutch 56 and the second clutch 58 are engaged, so that the first planetary gear set 22 rotates as one unit. A sixth gear ratio is expressed as: $i2/(1+\alpha 2)+i2\cdot \alpha 2\cdot i3/\{i4\cdot (1+\alpha 2)\}$ When $\alpha 1, \alpha 2, i1, i2, i3$ and $i4$ are respectively set to be 0.40, 0.55, 1.93, 0.94, 0.92 and 1.22, first to eighth gear ratios are 4.563, 2.702, 1.930, 1.469, 1.121, 0.858, 0.697 and 0.606, respectively. Accordingly, a first-second gear step, a second-third gear step, a third-fourth gear step, a fourth-fifth gear step, a fifth-sixth gear step, a sixth-seventh gear step and a seventh-eighth gear step are 1.689, 1.400, 1.314, 1.310, 1.307, 1.230 and 1.150, respectively. A wide gear ratio is 7.525 (=4.563/0.606), which is near that of the first embodiment, but gear steps are improved. That is, the first-second gear step is 1.689 and smaller, which can easily suppress a shift shock when the first forward gear is shifted to the second forward gear. In addition, the gear steps become smaller as the gear becomes higher, so that desirable gear ratios can be obtained for an automatic transmission of a motor vehicle with an internal combustion engine.

These appropriate gear ratios and gear steps are obtained because the third input ratio i3, determined by the teeth numbers of the intermediate gear 52 and the first reaction gear 50, is set to be an overdrive gear ratio, and the fourth input ratio i4, determined by the teeth numbers of the intermediate gear 52 and the second reaction gear 54, is set to be a reduced gear ratio in addition to the sixth gear ratio being different from that of the first embodiment.

Thus, an axial length of the automatic transmission of the second embodiment can be smaller than that of the first embodiment, due to a substitution of the damper 3 for the fluid coupling 2 of the first embodiment, although the moving-off clutch 74 is added.

Figure 6:
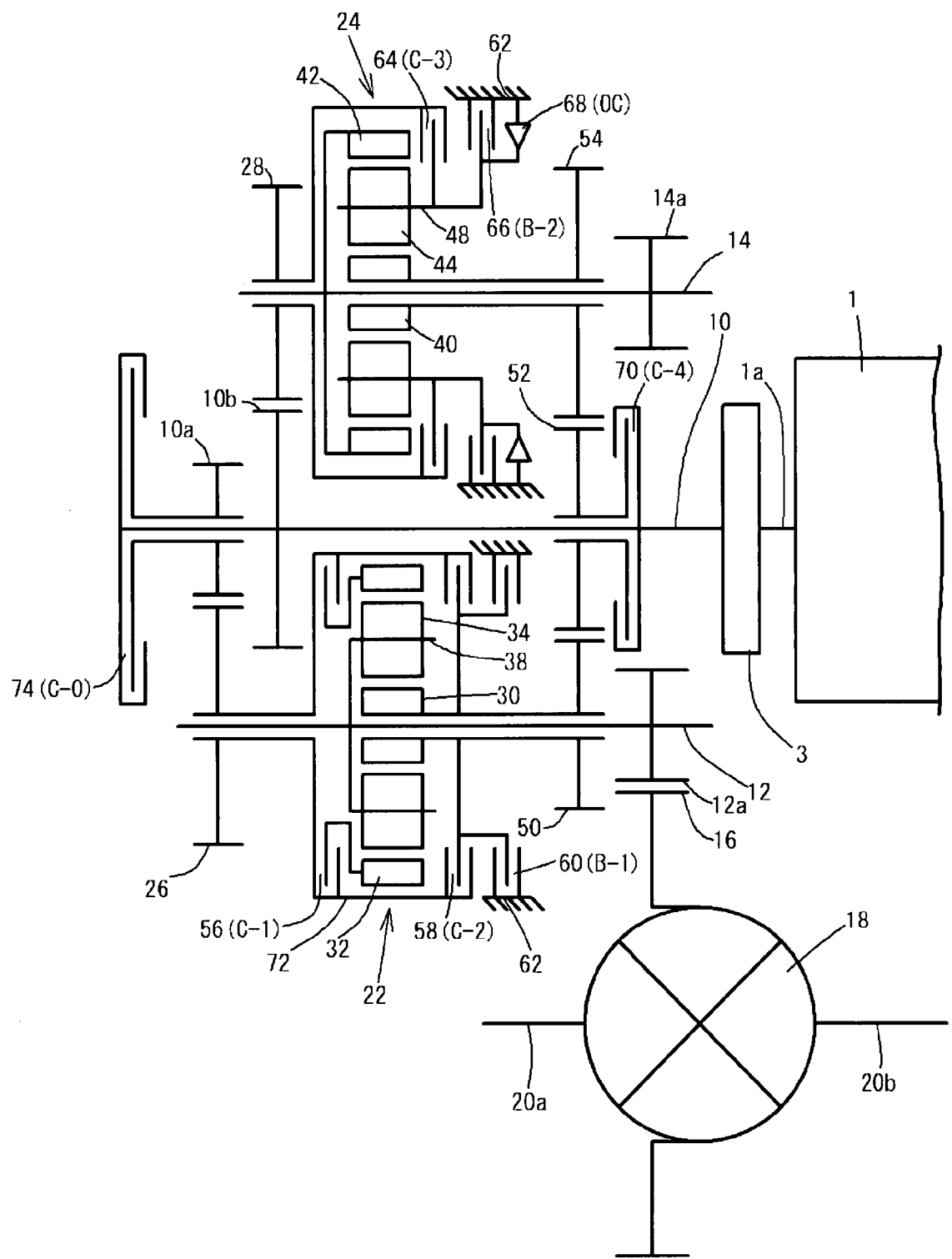
FIG. 6 is a schematic view showing a skeleton of a gear train of a multi-speed automatic transmission of a third preferred embodiment according of the present invention.

Next, a multi-speed automatic transmission of a third embodiment according to the present invention will be described with reference to the accompanying drawing of FIG. 6.

In the automatic transmission of the third embodiment, a moving-off clutch 74 is provided on an input shaft 10, not on an intermediate member 72 like the second embodiment, at an end portion, opposite to an engine 1, of the input shat 10 so that it can engage the input shaft 10 and a first input drive gear 10a. Accordingly, the input shaft 10 is connectable with the intermediate member 72 through the first input drive gear 10a and a first input driven gear 26.

A first brake 60 is a multi-plate brake, being different from that of the second embodiment.

The other parts are constructed similarly to those of the second embodiment, and n operation table is the same as that of the second embodiment shown in FIG. 5. Descriptions of the construction and operation of the third embodiment are omitted.

In the third embodiment, the moving-off clutch 74 is arranged at the end portion of the input shaft 10, which enables the moving-off clutch 74 to have larger diameter. This larger diameter is desirable when the moving-off clutch 74 is used for heavyweight vehicles and large-displacement engines the heat value of the moving-off clutch 74 becomes high. In addition, the automatic transmission of the third embodiment has the advantages similar to those of the first and second embodiments.

While there have been particularly shown and described with reference to preferred embodiments thereof, it will be understood that various modifications may be made therein, and it is intended to cover in the appended claims all such modifications as fall within the true spirit and scope of the invention.

For example, a torque converter may be used instead of the fluid coupling 2 shown in FIG. 1.

The second planetary gear set 24 may employ a double-pinion type one having second inner pinions and outer pinions instead of a single-pinion type one used in the first to third embodiments. The inner pinions and the outer pinions engage with each other and are supported by a second pinion carrier, where the inner pinions engage with a second sun gear and the outer pinions engage with a second ring gear. In this double-pinion type one, a second pinion carrier is connected with a second output shaft, and a second ring gear is connectable with a second input driven gear, which can provide more than six forward speeds.

The entire contents of Japanese Patent Applications No. 2006-121901 filed Apr. 26, 2006 are incorporated herein by reference.

What is claimed is:

1. A multi-speed automatic transmission adapted for a motor vehicle comprising:

a transmission case;

an input shaft having a first input drive gear and a second input drive gear;

a first output shaft having a first output drive gear at an one end portion thereof and arranged in parallel with the input shaft;

a second output shaft having a second output drive gear and arranged in parallel with the input shaft and the first output shaft;

a first input driven gear rotatable on the first output shaft and engaging with the first input drive gear;

a second input driven gear rotatable on the second output shaft and engaging with the second input drive gear;

an output driven gear in mesh with the first output drive gear and the second output drive gear;

a first planetary gear set interposed between the input shaft and the first output drive gear and arranged in coaxial with the first output shaft to change a rotational speed of the input shaft to a rotational speed of the first output drive gear, the first planetary gear set including a first sun gear, a first ring gear, a plurality of first pinions supported by a first pinion carrier and engaging with the first sun gear and the first ring gear;

a second planetary gear set interposed between the input shaft and the second output drive gear and arranged in coaxial with the second output shaft to change the rotational speed of the input shaft to a rotational speed of the second output drive gear, the second planetary gear set including a second sun gear, a second ring gear, a plurality of second pinions supported by a second pinion carrier and engaging with the second sun gear and the second ring gear; and an intermediate gear arranged in coaxial with the input shaft and connecting with the first sun gear and the second sun gear, wherein the input shaft is connectable with the first ring gear through the first input drive gear and the first input driven gear and is connectable with the second pinion carrier through the second input drive gear and the second input driven gear, the first output shaft being connectable with the first pinion carrier, the second output shaft being connectable with the second ring gear, the second pinion carrier being fixable to the transmission case, the first sun gear and the second sun gear being connectable with the input shaft through the first input drive gear and the first input driven gear and through the intermediate gear, and the first sun gear and the second sun gear being fixable to the transmission case.

2. The multi-speed automatic transmission according to claim 1, further comprising:

an intermediate member which is arranged in coaxial with the first output shaft and is arranged between the input shaft and the first ring gear and between the input shaft and the first sun gear so that the intermediate member can be connected with the first ring gear with by a first clutch and can be connected with the first sun gear by a second clutch, wherein the input shaft and the intermediate member are connectable with each other by a moving-off clutch.

3. The multi-speed automatic transmission according to claim 2, further comprising:

the moving-off clutch is arranged on one of the input shaft and the intermediate member.

4. The multi-speed automatic transmission according to claim 3, further comprising:

a first reaction gear engaged with the intermediate gear and connected with the first sun gear, and a second reaction gear engaged with the intermediate gear and connected with the second sun gear, wherein the intermediate gear and the first reaction gear provide an overdrive gear ratio, the intermediate gear and the second reaction gear providing a reduced gear ratio.

5. The multi-speed automatic transmission according to claim 2, further comprising:

a first reaction gear engaged with the intermediate gear and connected with the first sun gear, and a second reaction gear engaged with the intermediate gear and connected with the second sun gear, wherein the intermediate gear and the first reaction gear provide an overdrive gear ratio, the intermediate gear and the second reaction gear providing a reduced gear ratio.

6. The multi-speed automatic transmission according to claim 1, further comprising:

a first reaction gear engaged with the intermediate gear and connected with the first sun gear, and a second reaction gear engaged with the intermediate gear and connected with the second sun gear, wherein the intermediate gear and the first reaction gear provide an overdrive gear ratio, the intermediate gear and the second reaction gear providing a reduced gear ratio.

* * * * *